Nov. 30, 1943.　　　F. A. DOWNES　　　2,335,562
SLUDGE DIGESTER
Filed Jan. 27, 1942　　6 Sheets-Sheet 1

INVENTOR.
FRANK A. DOWNES,
BY Arthur Middleton
ATTORNEY

Nov. 30, 1943.   F. A. DOWNES   2,335,562
SLUDGE DIGESTER
Filed Jan. 27, 1942   6 Sheets-Sheet 3

INVENTOR.
FRANK A. DOWNES,
BY Arthur Middleton
ATTORNEY.

Nov. 30, 1943.  F. A. DOWNES  2,335,562
SLUDGE DIGESTER
Filed Jan. 27, 1942   6 Sheets-Sheet 4

INVENTOR
FRANK A. DOWNES,
BY
ATTORNEY.

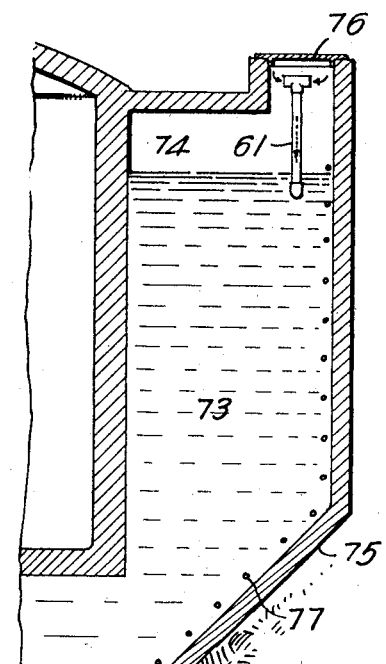
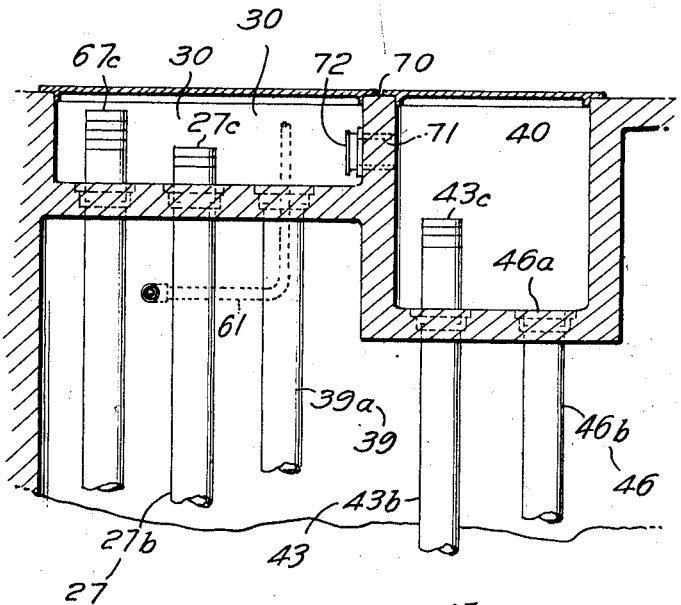
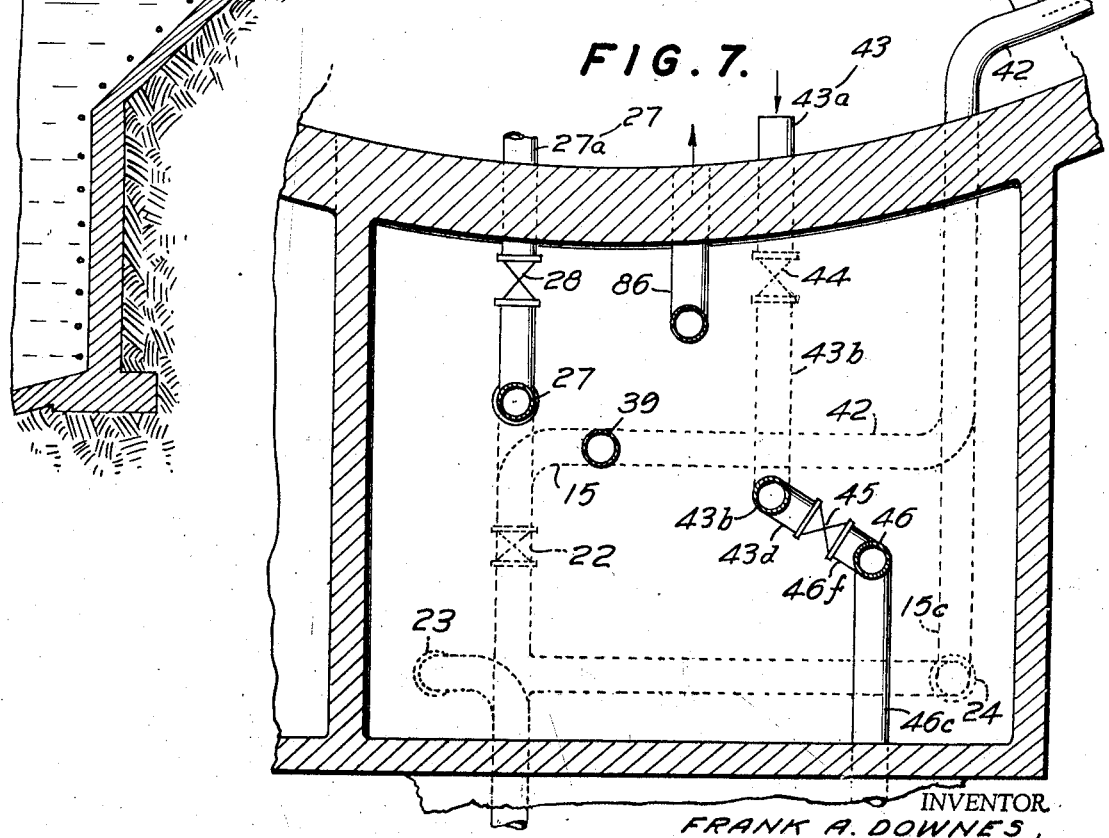

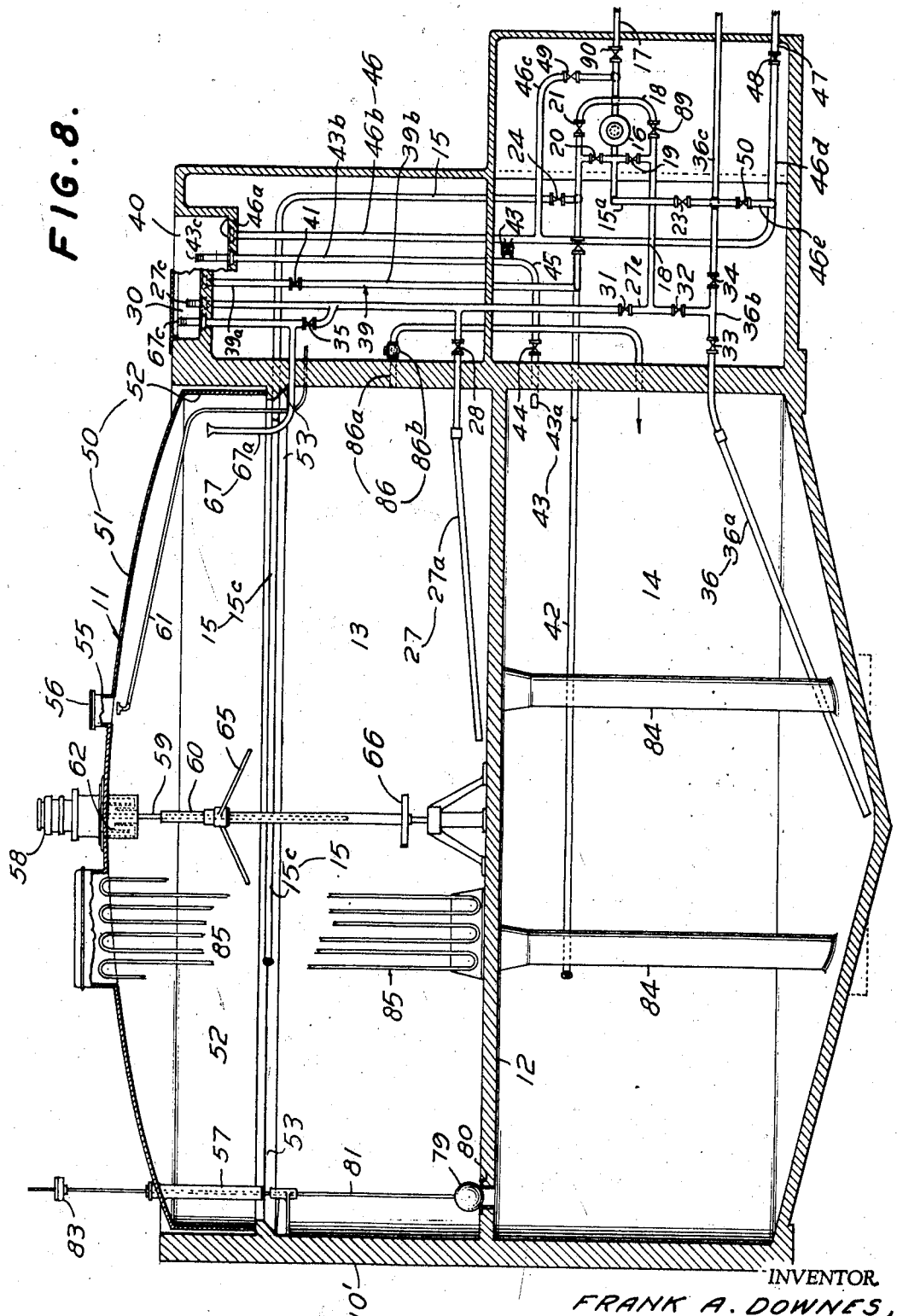

Patented Nov. 30, 1943

2,335,562

UNITED STATES PATENT OFFICE 2,335,562

SLUDGE DIGESTER

Frank A. Downes, Westport, Conn., assignor to The Dorr Company, New York, N. Y., a corporation of Delaware Application January 27, 1942, Serial No. 428,339

21 Claims. (Cl. 210—2)

This invention which is the basis of this specification relates to the biologic digestion of sludges made up of solids in suspension that have been derived from wastes of the type of sewage, trade wastes, and the like. Those solids thereof that are putrescible are rendered substantially innocuous by the digestion process that is basically carried out by organisms and bacterial flora that are called generically biologic and sometimes bacterial. The function of these biologic organisms is to convert the unstable organic substances of the sludge into conversion products that are stable and inodorous. In this conversion process, however, gas is produced that is largely methane ($CH_4$) and since it is combustible, it is advantageous to store it for industrial uses, so one requisite of this invention is to arrange for the effective collection and storage of such gas as may be produced within the digester of this invention.

Also in this conversion process, it becomes important to supply the useful biologic organisms with appropriate environment. It must be recalled that these organisms or bacteria are mobile but not motile. That is, they are not self-moving. Accordingly, food must be brought to them continuously for unlike vertebrates, they eat all the time without rest periods. Similarly, their waste products must be removed from their vicinity, or else they will be smothered by them, or their food so contaminated with such products that the organisms will starve. Thus, another requisite of this invention is to devise a digester provided with circulating mechanism for moving food to, and excrescences away from, the useful biologic organisms in the digester.

Sludge derived from sewage varies in the proportions of its constituents although the constituents almost always comprise fats, organics, and inorganics, besides of course liquid which is the medium in which these other things are suspended. These solids have a different rate of settling so that if supplied to a digester tank, and held there in quiescence, the inorganics such as sand would tend to settle as sediment at the bottom of the tank, while the fats, such as scum would rise and float in the top section of the tank. This stratification is to be avoided partly because all of the tank content must be brought within the range of action of the biologic organisms present in the tank, and partly to prevent the unproportional accumulation within the tank of some one constituent during the periodic withdrawal of liquid from the tank. That is, if the material were in the tank in stratified condition, when a quantity of material is withdrawn from say the bottom of the tank, the sand and other sediment would be thus drawn off while all of the scum would be left in the tank. Therefore, still another requisite of this invention is to provide a digester with agitating or circulating means for preventing stratification of suspended solids in the digester tank.

Biologic digestion divides itself into two types of which both are anaerobic (absence of air) and are sequential. That is, one type of bacterial feeds on the solid content of the sludge and converts it or at least some of it to liquid phase, so this type of bacteria is called a liquefier. Another type of bacteria, called gasifier, feeds on the liquids produced by the liquefier, and converts it to gas. Thus we have a two-stage process, namely, from solid to liquid, and from liquid to gas. Therefore, it has been found more beneficial in the rendering innocuous of putrescibles in sludge, to treat it in two stages or steps. To that end another requisite of this invention is to devise a unitary digester tank in which primary and then secondary digestion can take place.

Heretofore, two-stage digestion has been well taken care of where separate tanks could be used. Such a system is typified in the patent to Fischer and Lund, No. 1,989,589 but when two-stage digestion is to be carried out on a smaller scale, as when it is necessary to have the two stages housed within a unitary tank, many complications arise. Some of them have been solved by the invention of my U. S. Patent No. 2,195,408 granted April 2, 1940, which is based upon application Serial No. 50,130 filed November 16, 1935, and some of them have been solved by the invention of the U. S. Patent No. 2,274,953 granted March 3, 1942, and which is based upon an application Serial No. 312,640 filed January 6, 1940.

As to Patent 2,195,408, this discloses a unitary tank structure divided into superposed compartments by a substantially horizontal partition or tray. The upper compartment is provided with means for keeping liquid therein in agitation and preventing stratification of its content, while the lower compartment is arranged to hold liquid in quiescence to permit the settling of the solids content of the liquid in the form of sediment. Sludge to be treated is fed to the upper or primary compartment while treated sludge is withdrawn from the lower or secondary compartment. Partially treated sludge from the primary compartment is automatically and directly transferred to the secondary compartment; gas arising from both compartments is collected; and liquid from which suspended solids has settled is conducted from the upper section of the secondary compartment. In that arrangement there is provided free and open hydraulic communication between the two compartments, whereas in the present invention it is desired to use another method of such transfer. Further, in the arrangement, the agitating impellers operating in the upper compartment were offset from the center and used in multiple, whereas in the present invention it is aimed to make use of a single centrally located impeller since being centered seems to give one almost as great a range of action as several offset ones. The rearrangement of transfer means permits this change of location of the impeller means.

An important feature or aspect of the invention comprises the embodiment of means for transferring sludge from a primary digester compartment to a vertically-disposed secondary digester compartment under conditions whereby the sludge is not normally transferred directly from one compartment to the other but is withdrawn to an outside zone where it can be observed by an operator. By this method, the operator can inform himself of the progress of the digestion process and thus determine what control steps need to be taken in connection with it, if any. Such control features may include the time and quantity of sludge supplied to the primary compartment or zone; change of speed of the impeller means; and adjusting the liquid level in the primary digestion zone.

Another feature or aspect of the invetnion comprises the embodiment of suitable transfer means or passageways which may be automatic in operation, as for example, (a) by providing in the partition between the upper and lower compartments, or, as otherwise expressed, in the construction defining the floor of the upper compartment and the roof or ceiling of the lower compartment, upper relief valve that permits the escape of entrapped air or liquid from the lower chamber into the upper chamber if, for example, should the filling of the digester be accomplished by pumping sludge into the lower chamber or due to any other conditions which might result in substantial pressure differentials on opposite sides of the partition whereby the pressure at the underside of the partition would tend to lift the same; and (b) by the provision of means such as a release pipe leading directly from the lower interior portion of the upper compartment to and delivering into the lower compartment whereby to avoid undue loading on the floor of the lower compartment should there be an unduly abnormal lowering of the liquid in the lower compartment whereby the liquid in the lower compartment is not available for affording support for the roof thereof. The release piping is preferably normally closed by a relief valve opening in the downflow direction in order to thus avoid the undue loading on the floor of the upper compartment.

Another feature or aspect of the invention has in view the providing of a two-compartment construction in which one compartment, for example, the lower compartment, may be operated as a single digester with the other compartment out of operation, in which both compartments may each be similarly operated as simple digesters, to wit, in parallel arrangement, in which both compartments may be operated in serial arrangement whereby multi-stage digestion can be carried out therein, or in which one compartment may be used simply as a thickening and conditioning compartment, while the other serves as a main digester compartment.

According to other features or aspects of the invention the upper compartment is provided with agitating means and piping is provided for operating the upper compartment as a primary digester and with outside overflow weir at or approximately at the elevation of the normal operative level maintained or to be maintained in the upper compartment and piping leading downwardly for conducting to and into the lower compartment. There is also preferably provided pipe conveying means whereby sludge can be passed from the lower compartment back into the upper compartment. This piping preferably embodies a pump associated therewith and also has suitable branches each provided with a valve whereby sludge can be passed from the lower portion of the lower compartment and delivered (a) either into a locality outside of the tank; (b) to the upper compartment, or (c) back into another portion of the lower compartment. Likewise, this piping is arranged so that sludge can be pumped from the lower portion of the lower compartment and delivered therefrom (a) either to a locality outside of the tank, (b) into another portion of the upper tank, or (c) into the lower tank.

And another feature of this invention, or which may be used in connection with this invention, is an arrangement of parts wherein the tank with its tray, piping, and so on can be assembled, and thereafter it can be completed by the application to it of the top structure therefor that also carries the impeller mechanism and the driving means therefor. This arrangement can be made use of especially if the top structure is made into a gasometer structure with a depending flange, all adapted to float buoyantly upon a body of gas derived from the digesting sludge and trapped in the upper compartment, and which flange is submerged in the sludge for preventing the escape of gas therearound. This arrangement has the added advantage of permitting greater variation in liquid level in the primary zone, than would otherwise be the case, although if used under these conditions, there must also be provided adjustability of overflow from that zone.

The invention possesses other objects, aspects and features of advantage, some of which with the foregoing will be set forth in the following description. In the following description and in the claims, parts will be identified by specific names for convenience, but they are intended to be as generic in their application to similar parts as the art will permit. In the accompanying drawings, which constitute a part of this specification, there have been illustrated the best embodiments of the invention known to me, but such embodiments are to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of the specific embodiments when read in connection with the accompanying drawings.

In said drawings each embodiment of the invention is in the form of a biologic sludge-treating unit (a) having a tank divided by a horizontal tray or partition thereof into functionally separate upper and lower sludge-treating compartments, and (b) also having suitable piping, valves, pumping means, and other functional parts whereby certain selected operating steps can be carried out and performed in the unit according to the positioning of the valves thereof, each of which is under the control of an operating attendant.

In said drawings:

Fig. 5 is a vertical sectional view taken as on the broken line 5—5 of Fig. 3 looking in the direction of the arrows;

Fig. 6 is a vertical view of certain parts and is a view taken as on the planes indicated by the broken line 3—3 of Fig. 2 looking in the direction of the arrows. In this view the parts are at a larger scale than in the Fig. 2 or 3;

Fig. 7 is a horizontal sectional view taken as on the horizontal plane indicated by the line 7—7 of Fig. 1 or 3, looking in the direction of the arrows;

Fig. 8 is a view illustrating in vertical section a sludge digestion unit having a tank provided with a floating type of closure top therefor and embodying a horizontal tray or partition dividing the tank into upper and lower sludge-treating compartments, and also having valve-controlled piping and other parts operatively associated with the tank.

Figure 1:
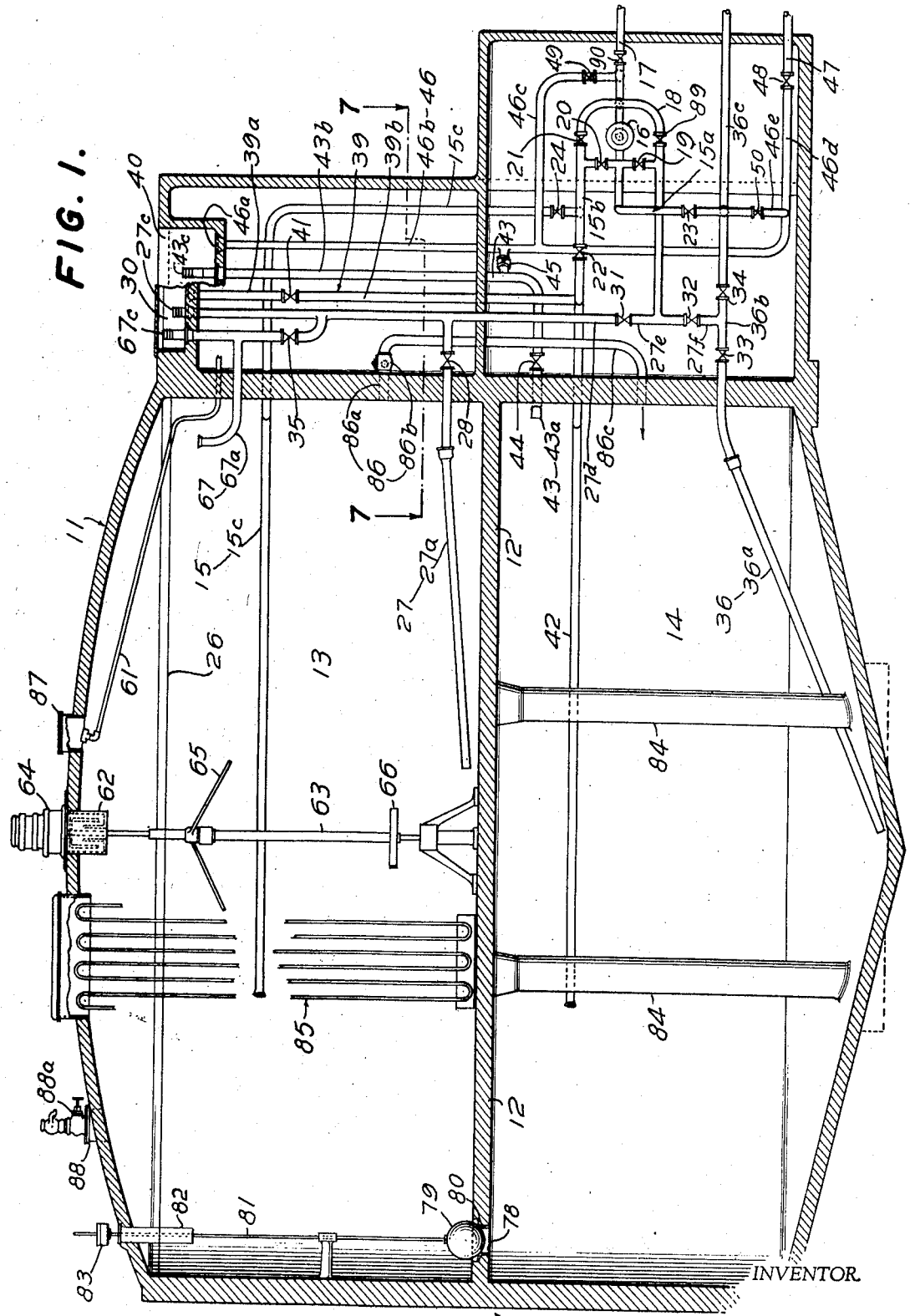
Fig. 1 is a view illustrating in vertical section a sludge digestion unit having a tank with stationary type of closure top therefor and embodying a horizontal tray or partition dividing the tank into upper and lower sludge-treating compartments, and also having valve controlled piping and other parts operably associated with the tank.
Figure 2:
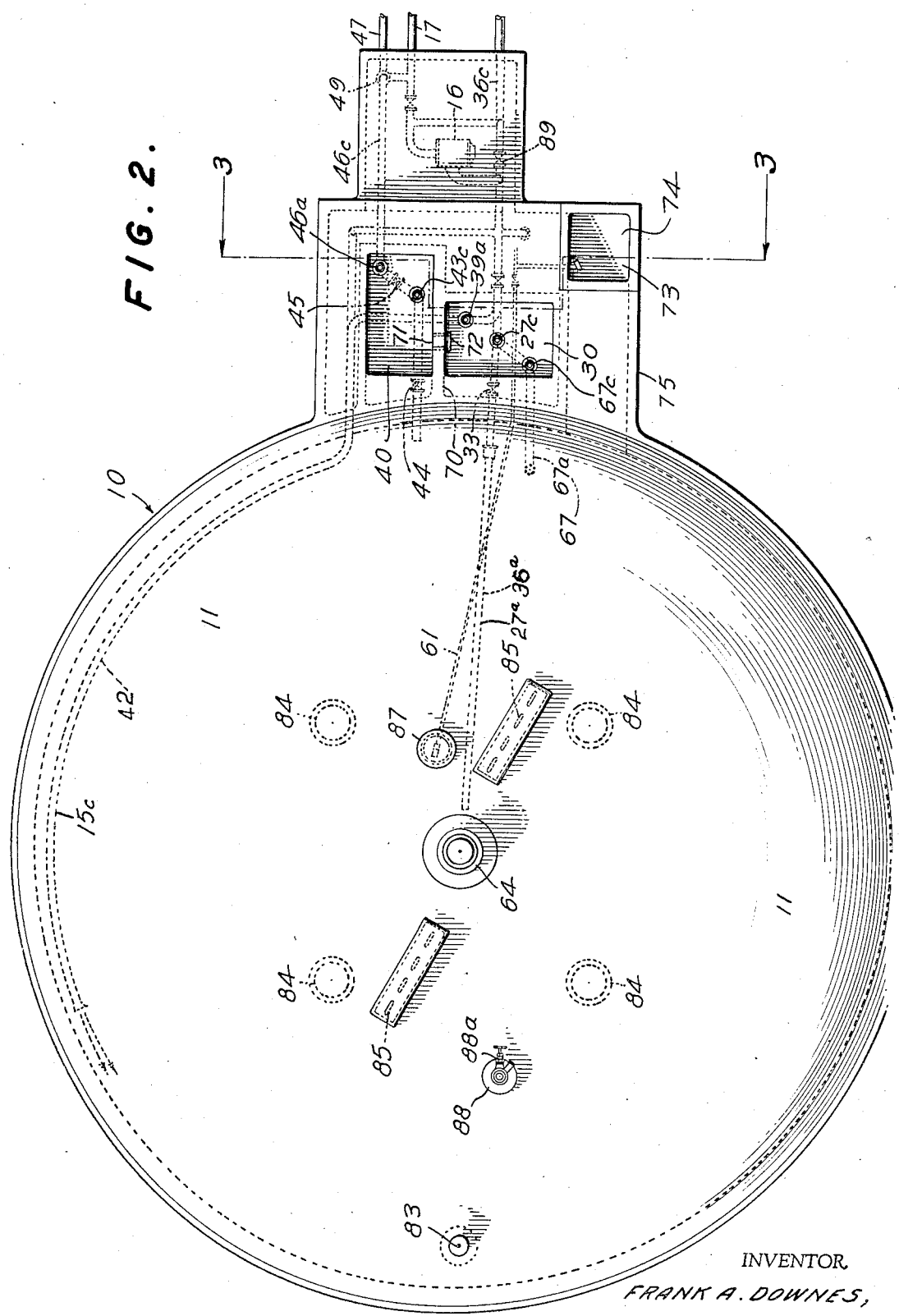
Fig. 2 is a plan view of the tank and associated parts shown in Fig. 1.
Figure 3:
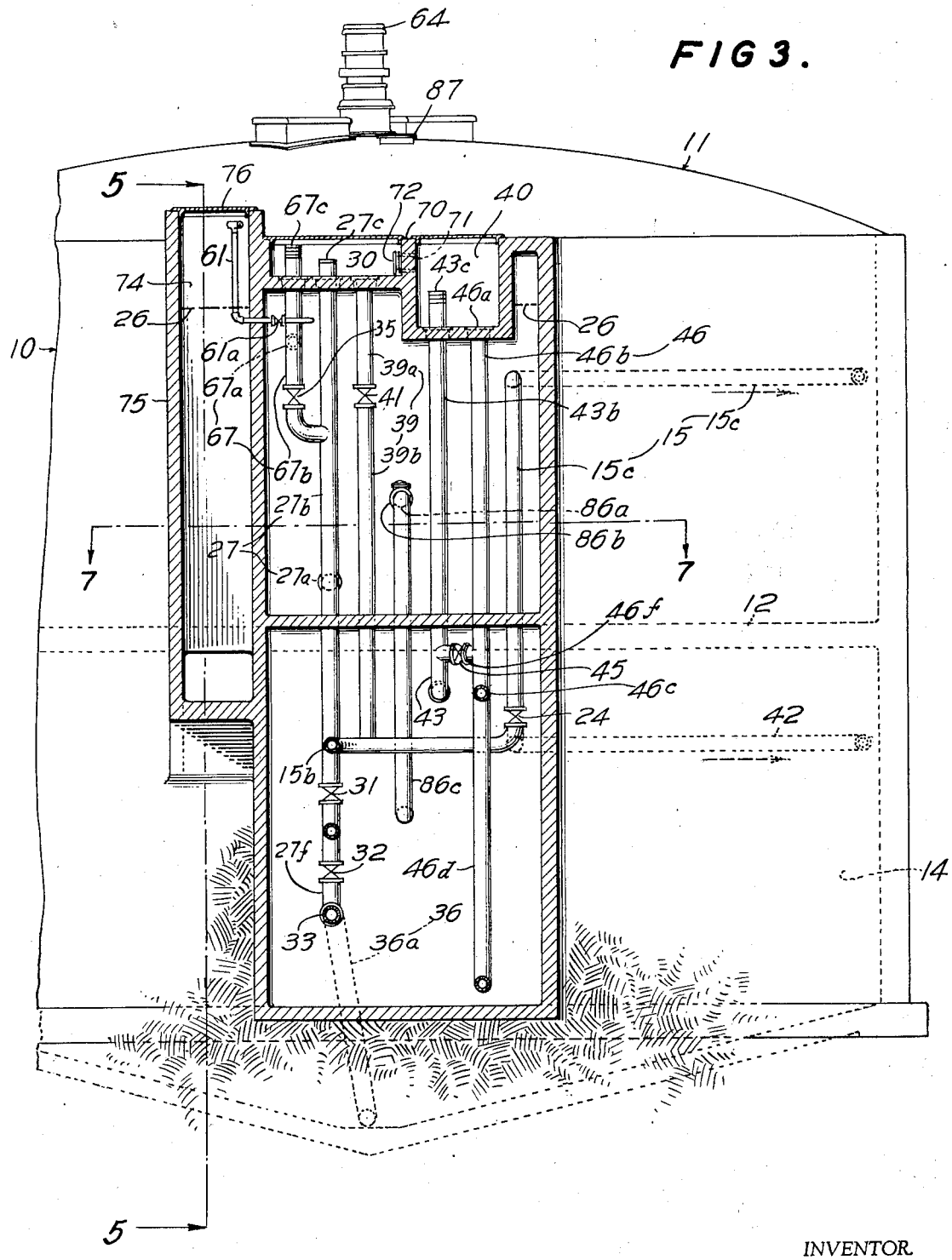
Fig. 3 is a vertical sectional view taken as on the vertical planes indicated by the broken line 3—3 of Fig. 2, looking in the direction of the arrows.
Figure 4:
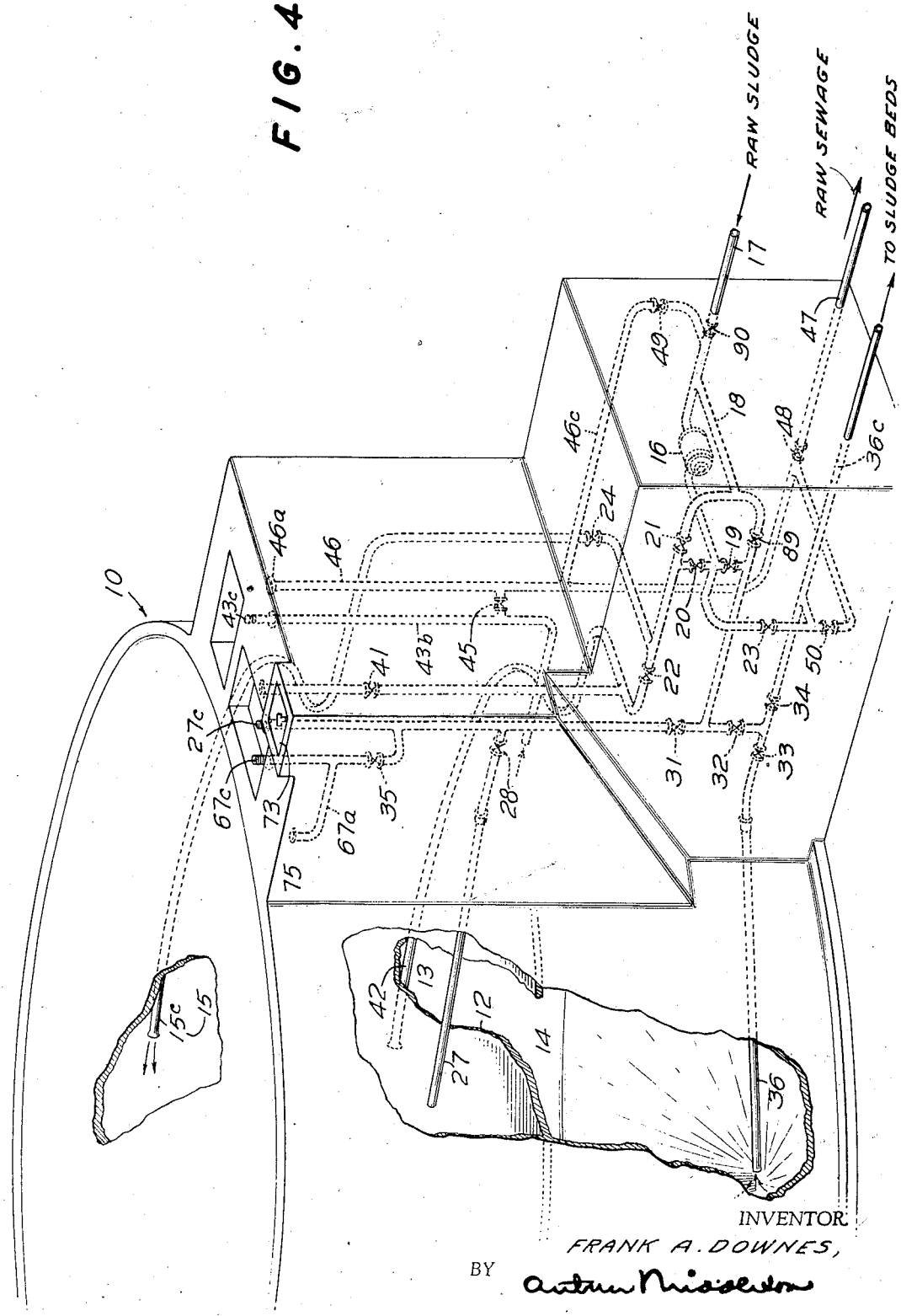
Fig. 4 is a perspective view schematically illustrating the piping, the valves thereof, the pump or pumping means, and other functional parts and their operative association with respect to the compartments of the tank.

Reference is now made to the drawings in detail. Each apparatus illustrated has been primarily designed for normally carrying out therein a multi-stage sludge-treating operation or for optionally carrying out therein a single-stage operation in an upper or lower compartment of the tank or parallel single-stage sludge digesting operations in both the upper and lower compartments thereof. The sludge to be treated is such as is usually derived from domestic or city sewage—or the like. It contains putrescible organic solids and fats or greases which respond to biologic sludge-digestion treatment. It also contains a certain amount of fine inorganic solids which are inert to biologic treatment but which settle as sedimented solids with some small proportion of the original solids which are not completely liquefied or gasified by the biologic digestion treatment.

Each apparatus as designed contemplates as the normal operation thereof the delivering from time to time according to general operative requirements of the sludge to be treated into an upper or primary sludge-treating compartment or zone, a detention and primary treatment of the sludge in said zone, a certain amount of mechanical agitation of the sludge in said zone, an automatic displaced transfer consequent to said feed of the primarily treated sludge from the upper zone into the underlying zone for secondary treatment, a detention and secondary treatment of the sludge in said secondary zone, and a consequent displaced release of treated secondary sludge from the apparatus in quantity normally corresponding to the quantity of sludge from time to time supplied for initial treatment to the primary zone. While the apparatus in question normally operates to carry out the multi-stage sludge treatment just referred to, nevertheless there has been embodied in and for this unitary type of digester such an arrangement of piping, valves, and other functional parts as will permit many other steps or orders of performance as will herein more fully appear. The apparatus or unit will be first described as to the main features thereof by which the normal multi-stage sludge treatment or digestion operations can be realized and thereafter it will be pointed out how the unit can function to carry out a single-stage digestion operation or operations.

*The unit of Figs. 1 to 7*

The unitary digester of these figures embodies a tank 10 disclosed as having a stationary closed top 11 and a horizontal tray or partition 12, dividing the tank into an upper sludge-treating chamber 13 wherein primary biological sludge-digestion of the anaerobic type takes place and wherein putrescible organic solids are substantially reduced by liquefying bacteria to liquids, and a lower treating chamber 14 wherein the biologic sludge digestion is continued as a secondary sludge-treating stage and wherein the liquid developed from the organic solids in the upper chamber is substantially converted to gases. These chambers 13 and 14 are respectively known as the upper or primary compartment and as the lower or secondary compartment.

In the normal operation raw sludge will from time to time be delivered into the upper compartment 13 through feed piping 15 having an upper feed delivery section or branch 15ᶜ. Such delivery of sludge is effected by means of a sludge pump 16 having an associated suction pipe section 18 that receives the incoming sludge from a raw-sludge supply pipe 17 when a valve 90 in the latter is open and when the valves of the system are otherwise properly set for such pumped delivery of the incoming raw sludge as feed to be treated. In passing from the pump 16 the feed piping 15 may be viewed as embodying in succession a pump discharge section 15ᵃ, an intermediate section 15ᵇ and the upper delivery section 15ᶜ, and as having in or associated with said sections valves as 19, 20, 21, 22, 23 and 24. During the period of feed into the upper compartment the valves at 19, 21, 22 and 23 are closed and valves 20 and 24 are open whereby such direct delivery of raw sludge from the supply pipe 17 through and from pump 16 will be through the sections 15ᵃ, 15ᵇ and 15ᶜ of the feed pipe 15 directly into the upper compartment.

When the upper compartment is substantially full of sludge as is the normal condition therefor, or in other words, when the sludge body has substantially reached or is at the level approximately indicated at 26 within the upper compartment, sludge outflows from the lower portion of the compartment through an upper sludge transfer or overflow pipe 27 having a low intake section 27ª, through a valve 28 therein then into and upwardly within a rising section 27ᵇ of the pipe and ultimately as overflow past a vertically adjustable or positionable upper weir end 27ᶜ as outflow into an inspection box or transfer pocket 30. This upper sludge transfer pipe 27 also has downwardly extending sections 27ᵈ, 27ᵉ and 27ᶠ with vertically spaced valves 31 and 32 therein. This pipe may properly be referred to as a valve-controlled upflow transfer pipe having a depending section with vertically spaced valves therein. With the parts in the relative position shown the upper weir end 27ᶜ of the sludge transfer pipe 27 is at elevation such as to determine the normal operative surface level of the sludge body within the tank, to wit, the surface level indicated as to elevation thereof by the line 26.

A sediment discharge pipe or lower sludge outflow pipe 36 leads from the lower interior portion of this lower compartment towards sludge beds and the depending section of the upper sludge transfer pipe 27 leads to this sediment discharge pipe 36. This sediment discharge pipe 36 embodies a low intake section 36ª, an intermediate section 36ᵇ into which the low pipe section 27ᶠ of pipe 27 merges and a discharge section 36ᶜ that leads towards sludge drying beds or otherwise from the unit. This sediment discharge pipe 36 is equipped with horizontally spaced valves 33 and 34 at each end of the intermediate section 36ᵇ thereof and, as above indicated, it will be noted that the lowermost section 27ᶠ of the downwardly extending or depending portion of pipe 27 merges into this intermediate section 36ᵇ.

The normal displaced outflow through the upper sludge transfer pipe 27 and past the overflow weir section 27ᶜ thereof is through the valve 28 of the pipe which is normally open and during this time valve 31 in the depending section 27ᵈ should be closed, and there should also be closed a valve 35 in a branch 27ᵉ that extends laterally from the rising section 27ᵇ.

The overflow from the pipe 27 is received within the box 30 and passes therefrom downwardly through a valve-controlled descending sludge-transfer pipe 39 into a lower valve-controlled secondary feed pipe 42 which may be viewed as a lower feed delivery section constituting a lower valve-controlled branch leading from the feed piping 15. The box 30 provides a first inspection or transfer pocket into which there is received sludge overflowing thereinto from past the weir section or tip member 27ᶜ or even sludge or supernatant liquid overflowing thereinto from past the high overflow tip or weir member 67ᶜ of the emergency or auxiliary outflow pipe 67.

The downflow sludge transfer pipe 39 embodies an upper section 39ª and a lower section 39ᵇ and furthermore is equipped with a normally open valve 41 located between said sections. In this way the overflow from the upper sludge transfer pipe 27 is passed by the downflow sludge-transfer pipe 39 into the upper portion of the lower or secondary compartment 14. In other words, in this connection it will be noted that the overflow from weir 27ᶜ is through the normally open valve 41 of the downflow pipe 39 and that there is no other obstructing valve which precludes such direct flow through and from the downflow pipe 39 into the lower feed pipe or secondary feed delivery branch 42. It will be borne in mind that as previously noted the valve 22 at this time is closed. It will also be noted that this valve 22 is functionally located between the pump 16 on the one hand and the place where the lower section 39ᵇ of the downflow sludge-transfer pipe 39 is connected into the lower feed pipe 42.

From the upper portion of the lower compartment 13 there extends a supernatant liquid outflow pipe 43 embodying an intake section 43ª, valve 44 which is normally open, and a rising section 43ᵇ terminating in an adjustable or positionable overflow weir 43ᶜ. It will here be noted that if one were to adjust the relative elevation for the overflow edges or ends 43ᶜ and 27ᶜ whereby the overflow elevation for 43ᶜ were higher than that of 27ᶜ then the elevation for the normal surface level as indicated by line 26 would be determined according to the elevation of weir end 43ᶜ. This pipe 43 also has a branch at 43ᵈ that is normally closed by a valve 45. The pipe 43 is provided for the transfer of supernatant liquid that is displaced consequent to the feed of sludge into the tank and which displaced supernatant liquid is allowed to pass from the secondary compartment as overflow into a second inspection or transfer pocket 40 and from thence as consequently released effluent from the unit outwardly through a final outflow or effluent release pipe 46, as for example, through a branch or section 46ᵈ delivering into a pipe or conduit 47 for conducting raw sewage or through a branch or section 46ᵉ delivering into a pipe or conduit section as 36ᶜ leading to some other place of disposition therefor, to wit, to sludge drying beds. The conduit 47 is equipped with a normally open valve 48 and any connection of the branch 46ᵈ should be to the conduit 47 at the intake side of the valve 48. This outflow or effluent release pipe 46 as shown provides a receiving throat 46ª and embodies a main downflow section 46ᵇ, an intermediate branch 46ᶜ leading toward a normally closed valve 49, a terminal section 46ᵈ connected to valve 48 of raw sewage pipe 47, a low branch 46ᵉ leading to the intake side of a valve 50 and a high branch 46 connected to this normally closed valve 45. In short the effluent release pipe 46 has a section or valve-controlled branch 46ᵈ leading directly to the raw sewage pipe 47 and a branch 46ᵉ leading to the valve 50 whereby the released effluent may be optionally delivered through either of said branches. This valve 50 is normally closed but is operatively connected to the discharge section 36ᶜ of the sludge discharge pipe leading to the sludge drying beds. If valve 48 is open the passing of supernatant liquid as outflow from pipe 46 is to the raw sewage pipe 47. If, however, valve 48 is closed and valve 50 is open there is then permitted a direct delivery to the sludge bed through the discharge section 36ᶜ of the sludge discharge pipe 36. If all of the effluent is to be recycled, then valves 48 and 50 would be closed, valve 49 would be opened and valve 90 in the raw sewage supply pipe 17 should be closed.

From the upper interior portion of the upper compartment 13 to wit, from elevation substantially higher than that of the normal liquid level as approximately indicated by 26, there is provision for the outward passage of gas through a valve-controlled outflow pipe 61 that extends from the upper interior portion of the upper compartment to a suitable gas receiving means or confining space as, for example, to a gas receiving space provided at 74 in the well or manhole chamber indicated at 73. See Figs. 3 and 5.

In the upper compartment there is a vertical shaft 63, the upper and lower ends of which are mounted in suitable bearings. The upper portion of the shaft is connected to a motor 64 and suitable driving and power transmission mechanism is provided for rotating the shaft from the rotor of the motor. The construction is such that a relatively gas-tight seal 62 is provided between the top structure of the tank on the one hand and the rotatable shaft on the other hand. It is to be noted that the shaft is provided thereupon within the upper portion of the upper compartment 13 with a propeller 65 and it has at the lower portion of said compartment an impeller 66 thereby providing within the upper compartment agitating means by which the sludge within the upper compartment is maintained in a turbulent state or is suitably agitated through the action of the propeller 65 in drawing into the center of the compartment fluid which is propelled downwardly into the action of the impeller 66 whose function is to dispel the same at the lower portion of the compartment toward the wall of the tank thereby to thus create a continuous circulation entirely around the axis of the compartment.

Near the upper portion of the compartment 13 there is provided an emergency or auxiliary outflow pipe 67 extending from the upper interior portion of the compartment into the transfer and inspection box 30. This auxiliary outflow pipe embodies an intake section 67ª and a vertical section 67ᵇ the upper or outer end of which terminates in an adjustable or positionable high overflow weir section 67ᶜ and the lower end of which is connected to the normally closed valve 35 previously referred to. The outer or overflow end 67ᶜ is normally slightly higher than the normal elevation level 26 of the liquid in the tank, to wit, as that elevation is determined, for example, by the overflow elevation of the weir terminal 27ᶜ of the outflow pipe 27. The discharge end 67ᶜ of the auxiliary outflow pipe 67 as well as the discharge end 27ᶜ of the outflow pipe 27, may be provided with overflow rings whereby the height of their discharge ends relative to the tank and also to each other may be controlled or adjusted. When this valve 35 is closed the pipe 67 merely operates as an auxiliary overflow. When this valve is open an outflow of supernatant liquid can pass directly from the pipe 67 and therefrom into the upflow sludge transfer pipe 27 and out through the overflow tip or weir section 27ᶜ of the latter. This employment of the valve 35 may be viewed as a provision for a secondary emergency overflow past the weir section 27ᶜ just referred to which normally is at an overflow elevation somewhat lower than that of the higher overflow tip of pipe 67. As both the pipes 27 and 67 are preferably tipped with removable and replaceable overflow rings it is possible to adjust the relative overflow height whereby the overflow elevation of pipe 67 is lower than that of pipe 27 whereby the entire outflow from the upper compartment is supernatant liquid that passes outwardly entirely through the pipe 67.

With respect to the inspection boxes or transfer receiving pockets 30 and 40 these are normally functionally separated by a partition 70 but a transfer opening 71 is provided through the partition. In this connection see Figs. 1, 2, 3 and 4. This opening is normally closed or controlled as to the effective opening area thereof by a valve or gate 72 which is readily accessible and positionable by hand. The valve-controlled opening leads from the lower interior portion of inspection box 30 and is provided to permit a "short circuit" or direct flow of liquid from the inspection or receiving box 30 into the box 40 whereby from box 30 as well as from box 40 there is permitted a relatively direct flow or release of sludge received by each of said boxes into and through the pipe 46. The construction which provides the pockets 30 and 40 may be referred to as an inspection box or as a transfer box disposed outside of the tank but adjacent the upper portion of the tank and which because of the partition 70 therein is divided into first receiving and second or subsequent receiving pockets that are completely separated from each other because of the partition. The first pocket is shallow as compared with the deep second pocket. Because of the transfer opening 71 through the partition 70 and the associated gate or valve 72 this partition may be viewed as providing a weir overflow or short-circuit passageway whereby according to the position of the valve or gate 72 a controlled overflow or a controlled transfer of liquid through or past said partition can be attained or realized. The position of said opening or passageway 73 is such that by opening the gate 72 the partition 70 may function as an outflow weir of elevation somewhat higher than that of the bottom of the first part but lower than that of the overflow weir tip 27ᶜ.

From the same figures it will be noted that the tank employs as a part thereof at 75 a projecting structure providing therein a manhole or access chamber 73 into and upwardly within which liquid from the lower compartment normally extends to an elevation which is that of the normal liquid level 26 within the tank. This chamber 73 also serves to permit a direct passage of gas from the lower compartment of the tank into the gas receiving space 74 provided in the upper portion of the chamber. This chamber is normally closed by a gas-tight cover 76 and, as previously pointed out, it provides the initial receiving space 74 for the gas passing from the upper compartment of the tank through the gas pipe 61. The gas pipe 61 is provided with a valve 61ª whereby passing of gas through the pipe 61 either to or from the chamber 73 can be cut off. The chamber 73 also serves—when freed of the gas therein—to provide an access opening or passageway whereby an operator can gain entrance to the interior of the lower compartment should such be required during a shut-down period and when the tank has been emptied for that purpose. To facilitate such access a series of ladder rungs 77 are provided as part of the permanent structure.

In a tank having a tray or transverse partition as 12 it is important to provide for the construction certain safeguards whereby the partition will not be lifted due to an excessive hydraulic pressure from below or whereby it will not be over-burdened due to a heavy static load on the upper portion thereof when it is not receiving counter-balancing liquid support or other suitable support from below. To prevent an excessive upward liquid pressure against the underside thereof there is provided an opening 78 through the partition which is normally closed by a ball valve 79 normally pressing against a seat 80 marginally defining the upper edge about said opening 78. This ball or valve can automatically rise or be lifted from its seat if the pressure at the underside of the valve substantially exceeds the pressure on the top portion of the valve. In other words, this valve 79 can be automatically lifted or raised from its seat to permit a released upflow of liquid from the lower compartment 14 into the upper compartment 13. This valve 79 has a rod 81 extending upwardly therefrom through a sleeve 82 that provides a cylindrical apron depending from the cover 11. By this rod the valve 79 can manually be lifted from its seat 80 through the medium of the rod extending upwardly from and outside of the tank. This rod also carries a shouldered portion 83 upon which weighing members can be applied or supported for more firmly holding the valve against its seat. The depending apron or sleeve 82 extends downwardly to an elevation that is somewhat below that of the normal level as indicated by 26 and provides an opening or pulp hole looking downwardly into the liquid holding section of the tank. The depending apron dipping into the body of sludge within the tank is of a character that prevents the escape of gas from the interior of the tank to the exterior thereof and also to prevent the entrance of air therethrough into the tank. The horizontally-extending tray or partition 12 has support for the general central section thereof which is afforded by four columns 84 rising from the foundation structure for the bottom of the tank. There is also provided for use in the upper compartment of the tank series of heating pipes 85 to which the heating fluid from any suitable source is supplied in any suitable manner, as and when required through valve means exteriorly located with respect to the apparatus. In order to avoid disruption or undue loading due to static downward pressure on the tray or partition 12 an emergency fluid release in the form of an emergency transfer pipe 86 has been provided. This pipe leads from a lower portion—but not necessarily from the lowest portion—of the interior of upper compartment 13 of the tank down to a locality within the lower compartment 14 of the tank. In other words, this pipe 86 embodies an intake section 86$^a$, a relief or check valve 86$^b$, and a delivery section 86$^c$. The check valve permits an automatic release of sludge from the upper compartment past the valve into the lower compartment as and when sludge or sediment is withdrawn from the lower compartment through the sediment discharge pipe 36 whereby the counter-balancing support normally afforded thereby is substantially lessened or removed. The check valve functions to prevent an upward flow of liquid from the lower compartment past the valve into the upper compartment.

The top 11 is provided with an opening that is normally covered by the cap member 87. This cap member preferably has a transparent window that enables a visual inspection of the contents of the interior of the tank and particularly as to the condition of the surface of the sludge therein and as to the effective functioning of the agitating or sludge intermingling means on the body of sludge in the compartment. This cover member 87, however, is preferably removable whereby the opening, which is normally closed, can be employed to provide access to the interior of the upper compartment of the tank if and when the tank is not in use and when it has been emptied for that purpose and also freed of the gas therein.

A second cap member 88 is indicated as being provided with a valve 88$^a$ that is normally closed but which can be opened to permit the escape of air from the interior of the tank, as for example, during the period when the tank is being filled. The valve 88$^a$ can also be employed to allow the escape of a quantity of gas from the interior of the tank for testing or other purposes.

In the filling of the tank in the first instance, the valve 79 is lifted from the seat 80 that marginally defines the upper edge of the opening 78 extending through the tray. Sludge is pumped into the tank—some of it passing upwardly through the opening 78. When the incoming sludge or liquid body provided thereby reaches up to the normal level for multi-stage operation, to wit, up to the approximate elevation indicated by line 26 then conditions exist whereby it is in order to lower the valve 79 to the normal closing position therefor and when this has been done the upper and lower compartments are then functionally separated whereby an elected type of biologic sludge digestion treatment can be carried out or performed in the unit. Thereafter the steps necessary for placing the apparatus as a whole into operation to carry out, for example, multi-stage digestion of the sludge can be initiated.

The method of starting up and carrying out a multi-stage, or a single-stage biologic sludge digestion is old and well-known and descriptive matter in connection with the biologic features of such operation is believed not to be necessary at this time. In view of the descriptive matter which has preceded, it will be obvious to any operator of a multi-stage digestion system as to how such process is readily carried out in the particular type of apparatus as described. However, as previously indicated the apparatus or unit already described is adapted for use in other manners.

The foregoing particularly and specifically relates to the apparatus illustrated by Figs. 1, 2, 3, 5, 6 and 7 and herein sometimes referred to as apparatus of form 1. As previously indicated, said apparatus is schematically illustrated as to the piping arrangement thereof by Fig. 4. The apparatus or unit of these figures is sometimes herein referred to as form 1.

In Fig. 8 there is illustrated an apparatus or unit which is herein sometimes referred to as apparatus of form 2.

Herein like reference characters indicate like parts or like functioning elements, as the case may be, and in general the main features of construction and modes of operation are substantially the same in both of the forms of apparatus or units herein described. An extended detailed description of form 2 is not incorporated herein as such extended description would needlessly and unduly extend the specification.

In form 2 tank 10' is substantially the same as tank 10 of form 1 except for the fact that the closure for the top thereof is a vertically-movable floatable cover 50 having an arch-shaped dome 51 with an integral downwardly extending flange portion 52. The cover 50 in its lowermost position rests upon the annular corble or circular ridge 53 that extend inwardly from the tank wall. The cover has an opening 55 normally covered by a capping member 56 that preferably has a transparent window whereby conditions within the tank may be viewed. The cover also has a tubular member 57 extending downwardly therefrom providing passage space for the rod 81 of the valve 79. This tubular member 57 has downward extent sufficient for it to always dip into the liquid body within the tank to provide a liquid regardless as to the vertical position of the cover. This tubular member 57 functions as a sealing member preventing the escape of gas from or the ingress of air into the tank interior.

A motor and actuating mechanism 58 is carried by the cover and actuates a shaft 59 having vertically sliding but driving engagement with the shaft 60 carrying propeller 65 and the impeller 66. This shaft 60 has support for the lower end in the form of a suitable bearing member mounted on the transverse partition 12. Except as indicated the general structure of the tank and the association of the pipes, pumps, and other mechanism of the unit are associated with the tank compartments so as to function in substantially the same manner as the corresponding parts of the unit of Fig. 1.

The constructional features of the second form have been described particularly as to those parts which structurally differ from the corresponding parts shown in the form 1, to wit, the form of Fig. 1, etc.

From that which has been said in connection with the description of the form 1, it will be manifest how the apparatus of form 2 can be used for normally performing a multi-stage digestion operation within the upper chamber or compartment of which there is carried out a primary sludge digestion treatment of the anaerobic type and wherein in the lower compartment thereof there is carried out a sludge digestion treatment which is in fact a continuation of the biologic treatment of the sludge which was initially treated in the upper compartment and which was displaced from the upper compartment into the lower compartment consequent to a from time to time feeding of raw sludge into the upper compartment and with an accompanied release of supernatant liquid from the upper portion of the lower compartment.

Tersely stated the multi-stage sludge digestion carried out in each of the units described is an anaerobic sludge digestion treatment which is referred to as a continuous type of treatment. In other words, the sludge is retained in the tank compartments for a sufficient length of time for the anaerobic digestion of the digestible organic solids therein to be consumed to a substantial extent.

In carrying out such process the raw sludge is passed from the raw sludge pipe 17 into the pump suction piping 18, thence into pump 16 and from the latter into the discharge section of the upper valve-controlled branch or feed pipe 15 directly into the upper compartment 13. This feeding or pumping of sludge into the upper compartment effects a displacement of a corresponding quantity of sludge into, upwardly through and from the sludge transfer pipe 27, to wit, as overflow past the upper end or overflow weir section 27ᶜ of pipe 27 into the inspection box or transfer pocket 30 from which there is a gravital flow of the overflowed sludge into the downwardly extending transfer pipe 39 and thence into the lower valve-controlled feed pipe branch 42 from which the transferred sludge is discharged directly into the lower compartment 14 with a consequent displacement of a corresponding quantity of treated sludge into, upwardly through and outwardly from pipe 43 as overflow past the weir-like tip 43ᶜ thereof into the second inspection box or transfer pocket 40; from the pocket 40 the overflowed liquid passes as effluent downwardly into and through the effluent release pipe 46 thence from the unit. This feed of sludge into the tank from the raw sludge pipe 17 generally takes place during only a portion of the day, for example, it may be one hour for some one plant or a substantially different period for another plant—depending upon operating conditions for a particular plant. Such type of feeding is referred to as a "from time to time feeding." It is to be borne in mind that at all times a relatively constant body of sludge is released in each compartment and the digestion operations or progressive consumption of the organic solids by the aerobic bacteria continues regardless as to whether a feeding of raw sludge is or is not actually taking place. Of course, the feed of sludge to the unit must be sufficient to provide organic solids that serve as food to support the process. All of the organic solids of the sludge are not actually consumed—there may be, for example 75% of them consumed. Such as are not consumed mainly settle as sediment. There are also in the sludge certain minerals or other inorganic solids which settle on the tray of the tank or in the bottom of the tank.

From time to time, according to operative requirements, there is a passing of the sedimented material from the tank. This outward passing of sedimented solids may be effected by pumping the sedimented material from the interior of the tank during a period when no raw sludge is being fed to the tank and the piping arrangement is such that the pump 16 can be employed for the purpose of discharging material from the tank, as, for example, outwardly to and through pipe section 36ᶜ leading to the sludge-drying beds. The outward passing of sludge from the tank compartment to the sludge beds may be effected by a gravity flow. The particular mode employed is dependent upon the positioning of the valves in the system. When, for example, it is desired to pass sludge from the lower portion of the lower compartment 14 by gravity flow through the pipe 36 having sections 36ᵃ, 36ᵇ and 36ᶜ to the sludge beds this is accomplished when the valves 33 and 34 are open and when valves 32, 23 and 50 are closed. If the transfer is to be effected by pumping from compartment 14, then the path of the pumped sediment is into and through pipe intake section 36ᵃ through valve 33 into pipe section 36ᵇ, through valve 32—valve 34 being closed—thence into pipe section 27ᵉ—valves 31 and 19 being closed—thence through valve 89 into and through pump suction-pipe section 18—valves 90 and 21 being closed—thence into and through pump 16 into pipe section 15ᵃ—valves 19 and 20 being closed—through valve 23 into and through pipe discharge section 36ᶜ leading to the sludge beds—valve 50 being closed as well as valve 34 which has been referred to as being closed.

By proper adjustment of valves of the system one can readily effect either a gravity flow of sludge from the upper compartment 13 outwardly through pipe 27 and depending sections 27ᵈ, 27ᵉ and 27ᶠ thereof to, into and through sediment-discharge pipe sections 36ᵇ and 36ᶜ.

By suitable positioning or adjustment of certain valves of the system there can be readily effected a pumping of sludge through the sludge transfer pipe sections 27ᵃ, 27ᵈ and 27ᵉ into the suction side of the pump 16 and the pumped delivery from the pump successively into and through pipe sections 15ᵃ and 36ᶜ.

If one elects to operate either form of unit described to simultaneously carry out a single-stage digestion treatment in the upper compartment 13 and another single-stage digestion treatment in the lower compartment 14 this is readily accomplished by closing the valve 41 in the downflow sludge transfer pipe 39 and by opening the passageway 71 in the partition existing between the inspection box or transfer pocket 30 and the inspection box or transfer pocket 40. Raw sludge is passed as feed into the upper compartment from the raw sludge supply pipe 17 by the pump 16 thence into the upper feed pipe or branch 15—past the valve 24 thereof—and from the discharge section 15$^c$ of said upper branch 15 directly into the compartment 13. The pumped feed effects a displacement of sludge through the sludge transfer pipe 27 past the overflow 27 thereof into the transfer box. The thus displaced overflow then passes through the opening 71 into the transfer pocket 40. There is also carried out a passing of pumped raw sludge from the pump 16 through pipe section 15$^a$ and 15$^b$ past the valve 22 thence into the low pipe section or low feed branch 42 into the lower compartment 14 with a consequent displacement of supernatant liquid from the upper interior portion of compartment 14 through the pipe 43—past a valve 44 therein—and ultimately as overflow through the upper weir end 43$^c$ into the inspection box or transfer pocket 40. Any sludge received within transfer box 40 passes as released outflow downwardly into the effluent release pipe 46 and optionally therefrom either into the discharge section 36$^c$ leading to sludge-drying beds or into the raw sewage pipe 47 in which the released effluent mingles with the raw sewage that is enroute to the sewage plant of which the unit constitutes a piece of apparatus for treating the sludge collected at other parts of the plant. The delivery of pumped sludge into the upper compartment and into the lower compartment can be made at different times by closing either valve 22 or 24, the other valve being open, or both valves 22 and 24 can be placed in partially open position so as to provide for split delivery of pumped sludge whereby some of it will pass through the upper feed pipe branch 15 into the upper compartment and some will be passed through the lower feed pipe branch 42 in the lower compartment.

If it is desired to effect the sludge digestion treatment solely by a single-stage operation in the upper compartment, then any feed of sludge to the lower compartment is cut off and all of the pumped sludge is fed into the upper compartment and all of the displaced sludge passes upwardly through the sludge transfer pipe 27 as overflow into the inspection box or transfer pocket 30 from which it flows directly into the transfer pocket 40 and thence from the unit.

It will also be noted that by closing the valve 28 in the intake branch of the sludge transfer pipe 27 and by opening the valve 35 in the lateral branch 27$^g$ of the sludge transfer pipe 27, then the displaced liquid will be the supernatant liquid from the upper interior portion of the tank, to wit, liquid which passes from the tank outwardly into intake section 67$^a$ of pipe 67, thence through the valve 35 into the rising section 27$^b$ of the sludge transfer pipe 27 and as overflow from the latter past the weir section 27$^c$ thereof.

It will also be noted that if valve 28 is continued closed and the valve 35 is continued closed, then the rising section 67$^b$ and the overflow tip 67$^c$ thereof will function to provide an auxiliary release construction for displaced supernatant liquid passing into the transfer box 30 and therefrom into the transfer box 40 and ultimately from the unit.

If all the sludge treatment is to be carried out as a single-stage digestion in the lower compartment, then there is no feed through the upper feed-line and all feed is through the valve 22 thence into and through the lower feed delivery section into the lower compartment and a consequent release from the latter of displaced sludge which flows outwardly therefrom into and through the pipe 43 thence through the valve 44 thereof and optionally therefrom either upwardly through section 43$^b$ of the outflow pipe 43 and as overflow past the weir section 43$^c$ of said pipe or upwardly into said section 43$^b$ and therefrom into and through branch 43$^d$ and valve 45—which has been opened for this purpose and from said valve into branch 46$^f$ that delivers into the downflow section 46$^b$ of the effluent release pipe 46. The latter flow-path provides for a relatively direct and low overflow passage of supernatant liquid from the pipe 43 to and into the effluent release pipe 46 whereby there is avoided the necessary existence of any substantial static head at the underside of the partition 12.

The arrangement of the valves in the piping system is such that there can be attained by means of the pump a forced recirculation of the liquid in either compartment with a resulting intermingling of the solids therein or of any fresh feed with the rest of the liquid body in that compartment. The arrangement is such that there can be allowed by a forced serial recirculation of the liquid within both compartments, for example, along a pathway comprising the sediment-discharge pipe 36, the piping leading from pipe 36 to the suction side of the pump 16, the pumping leading from the pump 16 into the upper compartment, the upper sludge transfer pipe 27, the sludge transfer box 30, the downflow pipe 39 and low feed trough 42 that delivers into the lower compartment 14, the associated supernatant outflow pipe 39 and effluent release pipe 46, the latter of which has a branch 46$^c$ leading into the suction side of the pump.

The pipe and pump arrangement is so flexible that many other steps or operations can be carried out or effected thereby as will become manifest as one follows the different flow-paths which are possible according to the adjustment of the valves at the will of an operator.

The overflow weir 27 is generally at an elevation that establishes the normal liquid level 26 within the tank. It will be remembered, however, that any one of the overflow weir ends 67$^c$, 27$^c$ or 43$^c$ could be established at an elevation which would cause that particular weir to establish the normal elevation for the body of liquid within the tank. However, the overflow weir 27$^c$ is one that is preferably employed for that purpose.

What is claimed is:

1. A biologic sludge-digestion unit comprising a tank, a tray disposed horizontally in the tank intermediate the upper and lower ends of the tank and providing within the tank an upper primary digestion compartment and a lower secondary digestion compartment, means for feeding sludge into the upper compartment, sludge-transfer means leading from the lower portion of the upper compartment, means for feeding sludge into the upper compartment, a sludge-transfer means leading from the lower portion of the upper compartment into the lower compartment and including (a) a box having sides rising substantially above the normal level of the sludge within the tank and a partition dividing the interior of the box into pockets which are normally functionally separated and of which one is identified as the first pocket and the other as the subsequent pocket, (b) a sludge-transfer pipe leading from the upper compartment and having a rising end terminating within the first pocket as an overflow weir at an elevation substantially higher than that of the tray but lower than that of the uppermost interior portion of the tank, and (c) a descending sludge-transfer pipe leading from the first pocket and terminating within the lower compartment, means for discharging supernatant liquid from the upper portion of the lower secondary compartment and embodying a rising conduit section terminating in said subsequent pocket as a secondary supernatant overflow weir at elevation substantially higher than that of the tray but lower than that of the uppermost interior portion of the tank, one of which said overflow weirs determines the normal level of the sludge within the tank, which said box-dividing partition includes as a part thereof a positionable gate whereby according to the position of said gate the partition is adapted to normally functionally separate said pockets or to permit an outflow of sludge from the first pocket past said partition into the subsequent pocket, means for passing sludge from said subsequent pocket, means for agitating sludge within the upper compartment, means for actuating the agitating means, means for passing gas from the upper portion of both compartments and for ultimately delivering gas from the unit, means for passing sediment from the lower portion of the lower compartment, means for passing sludge from a lower portion of the upper compartment and for delivering it to a locality outside of said digestion unit, and means providing direct communication between the compartments including an opening through the tray and a valve forming an upwardly opening closure for said opening.

2. A biologic sludge-digestion unit according to claim 1 and having means providing communicating passageway leading from the upper compartment into the lower compartment and including a check valve closing said communicating passageway against upflow but automatically permitting a downflow incident to static pressure substantially greater at the lower interior portion of the upper compartment than that at the upper interior portion of the lower compartment.

3. A biologic sludge-digestion apparatus comprising a tank, a tray therein dividing the tank into an upper primary digestion compartment and a lower secondary digestion compartment, gas-outletting means leading from the upper portion of both compartments and provided for conducting gas from the apparatus, supernatant liquid outlet means leading upwardly from an upper interior portion of the lower digestion compartment and including an upflow delivery section terminating as a secondary supernatant overflow member at elevation substantially higher than that of the tray but at elevation lower than that of the uppermost interior portion of the tank, means for feeding sludge into the upper compartment, means for agitating liquid within the upper compartment, means for actuating the agitating means, a box adapted for receiving sludge undergoing transfer and as to which box the lower portion thereof is at elevation higher than that of the tray but lower than that of the uppermost interior portion of the tank, means for passing sludge from the upper compartment into said box, valve-controlled downflow means for passing liquid from said box into the lower compartment, means for at will selectively passing sludge from the lower portion of the upper compartment or from the lower portion of the lower compartment for delivering to a locality outside of the apparatus, and gate-controlled means for at will passing sludge from said box, said tray having an opening provided for direct communication between the upper and lower compartments and equipped with an upwardly opening valve normally closing said opening for relieving excess fluid pressure in the lower compartment in the event of fluid withdrawal from the upper compartment.

4. A biologic sludge-digestion apparatus according to claim 3, in which the box includes a relatively shallow sludge-transfer section and a deeper subsequent secondary supernatant receiving section and a partition with adjustable gate that can be relied upon for at will functionally separating said sections or to allow sludge to flow from the first section into the subsequent section, in which the means for passing sludge from the upper compartment into the box delivers the sludge into the shallow section and from which shallow section the sludge undergoing transfer is through the valve-controlled downflow means into the lower compartment, in which the supernatant liquid outflow means leading upwardly from the lower digestion compartment delivers into the subsequent section of the box, and in which there is a discharge pipe leading from said subsequent section.

5. A biologic sludge-digestion apparatus comprising a tank including means normally isolating the upper portion from the lower portion thereof for forming an upper primary digestion compartment and a lower secondary digestion compartment, gas-outletting means leading from the upper portion of both compartments and provided for conducting gas from the apparatus, sludge-transfer means providing (a) an upflow section for passing sludge upwardly from a lower interior portion of the upper compartment and terminating in a sludge-transfer overflow member at elevation sufficiently high to insure the retention of liquid in the upper compartment up to a surface level whereat a body of sludge of substantial depth exists in the upper compartment and (b) a downflow section for conducting sludge passing said sludge-transfer overflow member into the lower compartment, valved means for discharging sediment from the lower portion of said lower compartment, and supernatant outflow means leading from the upper interior portion of the lower compartment and having a rising section terminating in an overflow member and also having a valve-controlled branch leading downwardly from a region thereof at elevation proximate that of the upper limits of the lower compartment.

6. A biologic sludge-digestion unit comprising a tank, a tray disposed horizontally in the tank intermediate the upper and lower ends of the tank and providing within the tank a primary upper digestion compartment and a lower secondary digestion compartment, means for optionally feeding sludge into the upper or into the lower compartment, or into both compartments, a sludge-transfer means leading from the upper compartment into the lower compartment and including (a) a box of which the lower interior portion thereof is at elevation higher than that of the tray, (b) a pipe leading from the interior of the upper compartment and terminating as a rising member constituting an overflow weir within the box but at elevation lower than that of the uppermost interior portion of the upper compartment, and (c) a valve-controlled downflow pipe leading from the lower interior portion of the box into the lower compartment, means for passing gas from the upper portion of both compartments and for ultimately delivering gas from the unit, means for discharging supernatant liquid from the upper portion of the lower secondary compartment and embodying an upflow section terminating as a secondary supernatant overflow member at elevation substantially higher than that of said tray but lower than that of the uppermost interior portion of the tank, means for optionally passing sludge from a lower interior portion of the upper compartment, means for optionally passing sludge from the lower interior portion of the lower compartment, and means providing direct communication between the compartments including an opening through the tray and a positionable valve normally closing said opening but upwardly movable from closing position incident to a predominating upward pressure on the underside of the valve.

7. A biologic sludge-digestion apparatus comprising a tank, a tray therein dividing the tank into an upper primary digestion compartment having a gas outlet leading from the upper portion thereof and a lower secondary digestion compartment having gas-transfer means leading from the upper interior portion of the lower compartment, supernatant liquid outlet means leading from the upper interior portion of the lower digestion compartment and having a rising delivery conduit section terminating as a secondary supernatant overflow member at elevation substantially higher than that of the tray but at elevation lower than that of the uppermost interior portion of the tank, means for feeding sludge into the tank comprising a branch terminating in the upper compartment and a valved branch terminating in the lower compartment, means for transferring sludge from the upper compartment into the lower compartment and comprising a sludge-transfer overflow member located externally of the tank and disposed at elevation substantially higher than that of said tray but lower than that of the uppermost interior portion of the tank, and means for passing sediment from the lower compartment, said tray having an opening provided for direct communication between the upper and lower compartments and equipped with an upwardly opening valve normally closing said opening for avoiding excess fluid pressure in the lower compartment.

8. A biologic sludge-digestion apparatus according to claim 7 and having means whereby sludge may be withdrawn from a lower interior portion of the upper compartment and passed from the apparatus.

9. A biologic sludge-digestion apparatus according to claim 7 and having means by which sludge may be withdrawn from the lower portion of the upper compartment and also having a valve-controlled pipe by which sludge may be withdrawn from the upper portion of the lower compartment and thereby passed from the apparatus while avoiding an upflow to and over the secondary supernatant overflow member.

10. A biologic sludge-digestion unit comprising a tank including a top, bottom and side walls, a partition dividing the tank into an upper digestion chamber and a lower digestion chamber but having a transfer opening therethrough, means for feeding sludge into the tank including a feed line having a valved upper branch and a valved lower branch of which the upper branch terminates in the upper chamber and the lower branch in the lower chamber, a transfer box at the upper exterior portion of the tank and as to which box the lower interior portion thereof is at elevation higher than that of the partition, a valved rising transfer pipe section leading from the upper primary chamber and having an upper end terminating as an over-flow member within the box at elevation lower than that of the top interior of the tank, a descending pipe section leading from the interior portion of said box and including a stop valve therein and having a connection to the lower branch of the feed line on the delivery side of the valve of said lower branch, a sediment-discharge pipe leading from the lower chamber and having a normally closed stop valve therein, gas-conducting means leading from the upper portions of said chambers, a supernatant outflow pipe leading from the upper portion of the lower chamber and having an upper end terminating as an overflow member at elevation substantially higher than that of the partition but lower than that of the top interior of the tank, an emergency transfer means having an annular seat member on said partition in register with said transfer opening and including a valve element restable on said seat for closing said passageway but freely liftable therefrom, means operable from the exterior of the tank for lifting said valve from its seat, and a release transfer means affording a passageway having an intake end leading from an interior of the upper chamber and a discharge end leading into the lower chamber, said last mentioned release transfer means having therein a normally closed release valve which opens to permit a downward transfer of sludge from the upper chamber incident to a substantial reduction of pressure at discharge side of said release valve.

11. A biologic sludge-digester unit comprising a tank including a top, bottom, side walls and a partition dividing it into an upper digestion compartment and a lower digestion compartment, means for feeding sludge into the tank including a feed line having a sludge pump therein, branching pipe sections leading from the pump of which an upper branch delivers into the upper compartment and a lower valved branch terminates in the lower compartment, sludge-transfer means leading from the upper compartment to the lower compartment and comprising an overflow member at elevation substantially higher than that of the partition over which any sludge flowing through said sludge-transfer means must normally pass, means for optionally passing sludge from the lower portion of either compartment to a locality outside of the unit, horizontally spaced rising columns that are inwardly disposed with respect to the side walls extending between the bottom of the tank and the partition for supporting the inwardly disposed portions of the partition against undue loading incident to abnormal withdrawal of sludge from the lower compartment, and means providing an upper upflow passageway leading from the upper portion of the lower compartment into the lower portion of the upper compartment and comprising as a member thereof a gravity-seated valve for closing said passage against downflow therethrough but movable from its seat to permit automatic upflow through said passageway incident to substantially unbalanced upward pressure at underside of the valve.

12. A biologic sludge-digestion unit comprising a tank including a top, bottom, side walls and partition dividing it into an upper chamber and a lower chamber, means for feeding sludge into the tank including a feed line having branches of which an upper branch terminates in the upper chamber and a lower branch terminates in the lower chamber and as to which branches at least the lower one is a valved branch, a transfer box at the upper portion of the tank and rising to an elevation substantially higher than that of the partition, a rising transfer pipe section leading from the upper chamber and terminating as an overflow weir within the box at an elevation lower than that of the uppermost interior portion of the tank, a descending pipe section leading from the interior portion of said box and having a connection to the lower branch of the feed line on the delivery side of the valve thereof, a sediment withdrawal means leading from the lower portion of the lower chamber, gas-conducting means leading from the upper portion of both said chambers and having a section leading to the exterior of the tank, a rising outflow pipe leading from the lower chamber and having an upflow portion terminating as overflow weir substantially higher than that of the partition but at elevation lower than that of the uppermost interior portion of the tank, an emergency transfer means embodying a seat member on the partition providing a communicating passageway between the upper and lower chambers and a gravity seated valve constituting an upward pressure relief element normally resting on said seat member for closing said passageway, and a release transfer means affording a passageway having an intake extending from a region of the upper chamber and a discharge leading into the lower compartment and including a downward pressure relief valve normally urged against a seat therefor provided by said means but movable from its seat incident to undue downward pressure when there is an insufficient static head for the sludge within the lower compartment to continue said last mentioned relief valve against its seat.

13. A biologic sludge-treating unit comprising a tank having a bottom, marginal side walls rising from the bottom and horizontal partition dividing the tank into an upper liquid-holding compartment and a lower sludge-digestion compartment, means comprising an upper feed pipe for feeding liquid into the upper compartment and a lower feed pipe for delivering liquid into the lower compartment, a rising main transfer pipe having an intake leading from the lower portion of the upper compartment and including an upper terminal serving as a main overflow, an auxiliary outflow pipe having an intake leading from the upper portion of the upper compartment and including an upper terminal serving as an auxiliary overflow at elevation higher than that of the main overflow, a valve-controlled pipe connection between the auxiliary outflow pipe and the rising main transfer pipe, means for receiving liquid passing thereinto from either of the aforementioned overflows and including a downflow pipe terminating as a lower feed pipe leading into the lower compartment, a supernatant liquid upflow pipe leading from the upper interior portion of the lower compartment and including an upper terminal serving as a third overflow at elevation higher than that of said partition, a valve-controlled pipe leading from said supernatant liquid upflow pipe at elevation proximate that of the partition, means for optionally withdrawing sludge from the lower interior portion of the upper compartment and for discharging the same from the unit, valve-controlled means for passing sedimented material from the lower portion of the lower sludge-digestion compartment, and means for collecting gas from the lower compartment.

14. A liquid-treating unit comprising a tank having a bottom, marginal side walls rising from the bottom and a horizontal partition dividing the tank into an upper compartment and a lower compartment, means for feeding liquid into the upper compartment, transfer means comprising a rising pipe section leading from the upper compartment and having an upper end constituting a main overflow weir, means for receiving liquid passing thereto from said main overflow weir and including a downflow pipe leading into the lower compartment, an effluent outflow pipe leading from the lower chamber and including an effluent overflow weir at elevation proximate that of the main overflow weir, means for receiving liquid passing thereto from said effluent overflow weir and including a descending discharge pipe leading from the unit, means providing a valve-controlled cross-connection leading from said effluent upflow pipe to said descending downflow discharge pipe, which valve-controlled cross-connection is at elevation proximate that of the horizontal partition, valve-controlled means for optionally feeding liquid to said lower compartment, and means for passing sediment from the tank.

15. A liquid-treating unit according to claim 14, in which there is means for passing liquid from a lower portion of the upper compartment to a locality outside of the unit.

16. A tank for use as a sludge-digestion unit comprising, a bottom, marginal walls rising therefrom, a transverse partition dividing the tank into an upper liquid-holding compartment and a lower sludge-digesting compartment, and in operative association therewith, a sludge pump, piping connected to the pump on the discharge side thereof for feeding liquid into the tank and including a feed-line having a branch for optionally delivering feed material into the upper compartment and a valve-controlled branch for optionally feeding liquid into the lower compartment, means for optionally passing material from the lower portion of the upper compartment into the lower compartment or from a lower portion of the upper compartment to a locality away from the tank, a supernatant liquid outflow pipe leading from an upper interior portion of the lower compartment and having an outflow branch rising to an elevation substantially higher than that of the partition and also having a low valve-controlled branch at elevation proximate said partition whereby supernatant liquid from the lower compartment can be optionally discharged from the rising outflow branch when the low outflow branch is closed or from the low valve-controlled outflow branch when the valve thereof is open, and means for optionally passing from the apparatus to the exterior thereof material from the lower interior portion of the lower compartment.

17. A sludge-treating unit comprising a tank having a bottom, marginal side walls rising therefrom, a top, a horizontal partition dividing the tank into upper and lower sludge-digestion compartments and symmetrically-spaced column members rising within the tank from the bottom of the tank and inwardly spaced with respect to the side walls of the tank for supporting inwardly disposed portions of the partition against downward loading pressure; a valve seat on said partition providing for a vertical flow passageway through said partition; a gravity seated valve normally resting on said seat; means operable from the exterior of the tank for optionally lifting the valve from said seat; which valve functions as an upflow release valve and as a stop valve for preventing downflow past the same; an emergency means affording a downflow passageway and having a downflow release valve normally closing said passageway the latter of which leads from a lower portion of the upper compartment into the lower compartment; and means for withdrawing sludge from the lower portion of the lower compartment and for passing the same to a locality outside of the unit.

18. A biologic sludge-digestion unit comprising a tank including a tray functionally dividing it into an upper digestion compartment and a lower digestion compartment, gas-outletting means leading from the upper portion of both compartments and providing for conducting gas from the unit, means for feeding sludge to be treated into the upper compartment, sludge-transfer means providing (a) an upflow section for passing sludge upwardly from an interior portion of the upper compartment and including a sludge-transfer overflow member at elevation substantially higher than that of the bottom of the upper compartment and lower than that of the uppermost interior portion of the upper compartment, and (b) a downflow section for conducting sludge passing said sludge-transfer overflow member into the lower compartment, valve-controlled sludge-discharge means leading from a lower portion of the upper compartment to a locality outside of the unit, valve-controlled sediment-discharge means leading from the lower portion of said lower compartment, means providing an upflow passageway extending between the lower compartment and a lower portion of the upper compartment and equipped with an upwardly opening valve normally closing said upflow passageway but movable from its closing position for relieving excess fluid pressure in the lower compartment in the event of sludge discharge from the upper compartment to a locality outside of said unit, and supernatant outflow means leading from the upper interior portion of the lower compartment and having a rising section terminating in an overflow member higher than that of the bottom of the upper compartment and lower than that of the uppermost interior portion of the upper compartment.

19. A biologic sludge-digestion unit according to claim 18 and comprising a valve-controlled branch extending from said liquid outflow means and leading downwardly from a region thereof at elevation proximate that of the tray, and means providing a downflow passageway between a lower portion of the upper compartment and the lower compartment and equipped with a downwardly opening valve normally closing said downflow passageway but movable from closing position therefor for relieving excess fluid pressure in the upper compartment in the event of sediment withdrawal from the lower compartment.

20. A biologic sludge-digestion unit comprising a tank, a tray disposed horizontally in the tank intermediate the upper and lower ends thereof and providing within the tank an upper digestion compartment and a lower digestion compartment, means for feeding sludge to be treated into the upper compartment a sludge-transfer means leading from the upper compartment into the lower compartment and including (a) a box of which the lower interior portion thereof is at elevation higher than that of the tray, (b) a pipe leading from the interior of the upper compartment and terminating within the box, (c) a rising member providing within the box an overflow sludge-transfer weir at elevation lower than that of the uppermost interior portion of the upper compartment and (d) a downflow pipe leading from the box for passing sludge overflowing thereinto into the lower compartment, gas-outletting means leading from the upper portion of both compartments and provided for conducting gas from the unit, means for discharging supernatant liquid from the upper portion of the lower compartment and embodying an upflow section terminating as a supernant overflow weir at elevation substantially higher than that of said tray but lower than that of the uppermost interior portion of the tank, a valve-controlled sludge-discharge means for optionally passing sludge from a lower interior portion of the upper compartments, a valve-controlled sediment-discharge means for optionally passing sediment from the lower interior portion of the lower compartment, means providing an upflow passageway between the lower compartment and a lower portion of the upper compartment, and a positionable valve normally closing said upflow passageway but movable from closing position incident to a predominating upward pressure on the underside of the valve.

21. A biologic sludge-digestion unit, according to claim 20, in which the sludge transfer means leading from the upper compartment into the lower compartment comprises as a part thereof an upwardly extending pipe terminating within the box as an overflow member at elevation lower than that of the uppermost interior portion of the tank and rising from a section of the valve-controlled sludge-discharge means functionally ahead of the valve thereof, said unit also comprising means providing a downflow passageway leading from a lower portion of the upper compartment into the lower compartment, a valve normally closing said downflow passageway but movable from closing position incident to a predominating downward pressure on the upper side of said valve, and a valve-controlled branch leading from the supernatant outflow means for the lower compartment and having a high section thereof at an elevation proximate that of the tray.

FRANK A. DOWNES